United States Patent
Matsumoto (10) Patent No.: US 6,880,688 B2
(45) Date of Patent: Apr. 19, 2005

(54) DRIVING FORCE TRANSMITTING APPARATUS

(75) Inventor: Akio Matsumoto, Anjo (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/650,850

(22) Filed: Aug. 29, 2003

(65) Prior Publication Data
US 2004/0040812 A1 Mar. 4, 2004

(30) Foreign Application Priority Data
Aug. 30, 2002 (JP) .................................. 2002-252764

(51) Int. Cl.[7] .............................................. F16D 47/00
(52) U.S. Cl. ................... 192/35; 192/54.52; 192/84.91; 192/93 A
(58) Field of Search .......................... 192/35, 40, 48.2, 192/54.5, 54.52, 84.7, 84.9, 84.91, 93 A, 70.23

(56) References Cited

U.S. PATENT DOCUMENTS

| | | | | |
|---|---|---|---|---|
| 5,505,285 A | | 4/1996 | Organek | |
| 5,810,141 A | * | 9/1998 | Organek et al. | 192/35 |
| 5,890,573 A | * | 4/1999 | Kwoka | 192/35 |
| 5,960,916 A | * | 10/1999 | Organek et al. | 192/35 |
| 6,315,096 B1 | * | 11/2001 | Dairokuno et al. | 192/35 |
| 6,343,681 B1 | * | 2/2002 | Aoki | 192/35 |
| 6,571,928 B1 | | 6/2003 | Gassmann | |
| 6,698,562 B1 | * | 3/2004 | Teraoka et al. | 192/35 |
| 6,719,110 B1 | * | 4/2004 | Ishikawa et al. | 192/35 |

* cited by examiner

*Primary Examiner*—Saul Rodriguez
(74) *Attorney, Agent, or Firm*—Oblon, Spivak, McClelland, Maier & Neustadt, P.C.

(57) ABSTRACT

A driving force transmitting apparatus includes a clutch mechanism for bringing a pilot clutch to a frictionally engaged condition, and a cam mechanism for bringing a main clutch for transmitting driving force to a frictionally engaged condition during operation of the clutch mechanism. The cam mechanism includes a pilot cam member, a main cam member, a stopper member, and a biasing means for biasing the stopper member in a rotational direction for respectively engaging the pilot cam member and the main cam member to the stopper member. A position of the pilot cam member, the main cam member, and the stopper member is determined depending on a relationship between a biasing force to the stopper member by the biasing means and a torque to the pilot cam member.

14 Claims, 5 Drawing Sheets

DRIVING FORCE TRANSMITTING APPARATUS

CROSS REFERENCE TO RELATED APPLICATIONS

This application is based on and claims priority under 35 U.S.C. §119 with respect to a Japanese Patent Application 2002-252764, filed on Aug. 30, 2002, the entire content of which is incorporated herein by reference.

FIELD OF THE INVENTION

This invention generally relates to a driving force transmitting apparatus such as a clutch mechanism disposed in a vehicle driving force transmitting path. More particularly, the invention pertains to a coupling mechanism disposed between a driving system for driving front wheels of a four-wheel-drive vehicle and a driving system for driving rear wheels thereof.

BACKGROUND OF THE INVENTION

Figure 8:
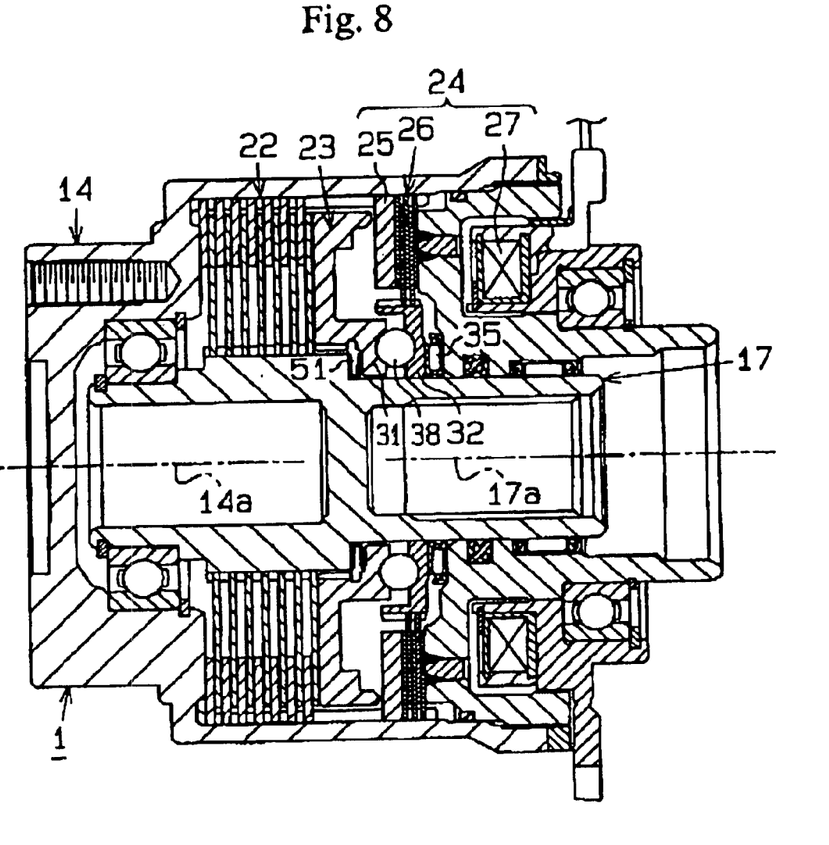
FIG. 8 is a sectional view illustrating a conventional driving force transmitting apparatus.

As illustrated in FIG. 8, when an electromagnet 27 of an electromagnetic clutch mechanism 24 is electrically excited, an armature 25 is electrically attracted by the electromagnet 27 such that a pilot frictional clutch 26 is brought into a frictionally engaged state. When a relative rotation is then produced between an outer casing 14 and an inner casing 17, a torque T is transmitted to a pilot cam member 32. For example, when the vehicle is driven in a forward direction during the frictional engagement of the pilot frictional clutch 26, the pilot cam member 32 is transmitted with the torque T in an arrow direction illustrated in FIG. 9(a). On the other hand, when the vehicle is driven in a rearward direction or when engine braling is performed, the pilot cam member 32 is transmitted with the torque T in an arrow direction illustrated in FIG. 9(b) which is opposite to the direction illustrated in FIG. 9(a). In whichever driven condition the vehicle is, the torque T is amplified by a cam mechanism 23 including a main cam member 31, a spherical cam member 38, and the pilot cam member 32 and is transformed to a thrust S along rotational axes 14a and 17a. A main frictional clutch 22 is brought to a frictionally engaged state depending on the thrust S, thereby enabling to transmit the driving force between the outer casing 14 and the inner casing 17.

Figure 9:
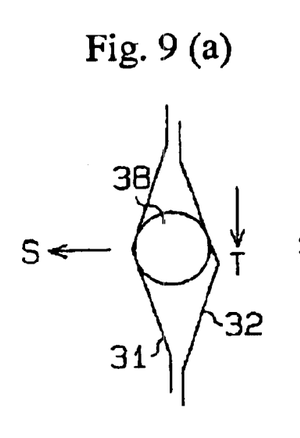

When the electric excitation to the electromagnet 27 is terminated, the armature 25 is released from being attracted by the electromagnet 27. In this case, the pilot cam member 32 and the main cam member 31 integrally rotate via the spherical cam member 38 as illustrated in FIG. 9(c). The main frictional clutch 22 is then released from the frictionally engaged state, thereby interrupting transmitting the driving force between the outer casing 14 and the inner casing 17.

However, in the above-described condition where the electromagnet 27 has not been electrically excited, inner plates of the pilot frictional clutch 26 may be dragged by outer plates thereof due to high viscosity of oil in the driving force transmitting apparatus 1 at a relatively low temperature. This unfavorable dragging may occur especially when a rotational speed of the vehicle front wheel is lower than one of the vehicle rear wheel in the above-described condition. In this case, the pilot cam member 32 may be transmitted with a drag torque t in an arrow direction illustrated in FIG. 9(c). The drag torque t is amplified by the cam mechanism 23 in the same manner as the torque T illustrated in FIG. 9(b). The amplified drag torque t is transformed to the thrust S and is transmitted to the main frictional clutch 22. Therefore, the main frictional clutch 22 may be brought to the frictionally engaged state, thereby unnecessarily transmitting the driving force between the outer casing 14 and the inner casing 17. This may cause instable control of the driving force transmitting apparatus 1.

In light of foregoing, in the conventional driving force transmitting apparatus 1, a return spring 51 such as a disc spring is provided for biasing the main cam body 31 along the rotational axes 14a and 17a in a direction against the thrust S. The return spring 51 preferably acts for preventing the main frictional clutch 22 from being brought to the frictionally engaged condition. In the meantime, at least following three problems may possibly occur by providing the return spring 51 in the conventional driving force transmitting apparatus 1.

1) In order to reduce rolling resistance of a needle roller bearing 35 supporting the pilot cam member 32, an urging force of the return spring 51 is required to be reduced as well. Meanwhile, in order to restrain the drag torque t which occurs due to the high viscosity of the oil in the driving force transmitting apparatus 1 at the relatively low temperature, the urging force of the return spring 51 is required to be increased. Therefore, according to the conventional driving force transmitting apparatus 1, the drag torque t may not be effectively restrained concurrently with reduction of the rolling resistance of the needle roller bearing 35.

2) The drag torque t is amplified and transformed to the thrust S of the main cam member 31, and the return spring 51 then counteracts the thrust S of the maim cam member 31. The return spring 51 possesses the urging force for biasing the main cam member 31 in the direction against the thrust S along the rotational axes 14a and 17a. At this point, the pilot cam member 32 is applied with the urging force of the return spring 51 via the spherical cam member 38, which urging force is set to be relatively large in its degree to counteract the thrust S. Therefore, the rolling resistance (i.e. a frictional resistance) of the needle roller bearing 35 supporting the pilot cam member 32 may be increased.

3) Not only under the above-described electrically non-excited condition of the electromagnet 27 as illustrated in FIG. 9(c), the return spring 51 biases the main cam member 31 in the direction against the thrust S along the rotational axes 14a and 17a also under the electrically excited condition thereof as illustrated in FIGS. 9(a) and (b). Therefore, when the electromagnet 27 has been electrically excited, the control of the conventional driving force transmitting apparatus 1 may easily get instable due to uniformity of the urging force of the return spring 51.

A need thus exists for providing a driving force transmitting apparatus capable of overcoming the above-described possible problems and restraining the drag torque concurrently with reduction of the rolling resistance (i.e. the frictional resistance) of the pilot cam member and the main cam member.

SUMMARY OF THE INVENTION

In light of foregoing, a driving force transmitting apparatus of the present invention includes a main clutch for transmitting driving force between a first rotational member and a second rotational member disposed to be rotatable relative to each other, a clutch mechanism for bringing a pilot clutch to a frictionally engaged condition, and a cam mechanism for bringing the main clutch to a frictionally engaged condition when the clutch mechanism operates for bringing the pilot clutch to the frictionally engaged condition. The cam mechanism includes a pilot cam member, a main cam member, and a stopper member. The pilot cam member, the main cam member, and the stopper member are relatively rotatable. The cam mechanism further includes a biasing means for biasing the stopper member in a rotational direction for respectively engaging the pilot cam member and the main cam member to the stopper member.

According to an aspect of the present invention, a position of the pilot cam member, the main cam member, and the stopper member in a rotational direction is determined depending on a relationship between a biasing force applied to the stopper member by the biasing means and a torque applied to the pilot cam member.

According to another aspect of the present invention, the main clutch is brought to a frictionally engaged condition by a thrust generated to the main cam member substantially in parallel with a rotational axis of the second rotational member when the clutch mechanism operates. The thrust is generated in response to a torque applied to the pilot cam member via the frictionally engaged pilot clutch in accordance with a relative rotation between the first rotational member and the second rotational member during the operation of the clutch mechanism. Meanwhile, the thrust is restrained from being generated to the main cam member by a biasing force of the biasing means applied to the stopper member against a torque which can be applied to the pilot cam member when the clutch mechanism does not operate.

It is preferable that the stopper member includes a restraining means for restraining a relative rotation of the main cam member and the pilot cam member.

It is further preferable that the restraining means is an engaging projection which engages with the main cam member and the pilot cam member. The biasing means biases the stopper member in a direction for engaging the engaging projection of the stopper member with the main cam member.

According to still another aspect of the present invention, the main clutch is brought into a frictionally engaged condition by a thrust generated to the main cam member substantially in parallel with a rotational axis of the second rotational member. The thrust is generated in response to a torque transmitted to the pilot cam member via the pilot clutch in accordance with a relative rotation between the first rotational member and the second rotational member in a direction. Meanwhile, the thrust is restrained from being generated to the main cam member by a biasing force of the biasing means which restricts a relative rotation between the first rotational member and the second rotational member in the other direction.

BRIEF DESCRIPTION OF THE DRAWING FIGURES

The foregoing and additional features and characteristics of the present invention will become more apparent from the following detailed description considered with reference to the accompanying drawing figures wherein:

FIGS. 5(a) and (b) are explanatory views for explaining operation of the cam mechanism;

FIGS. 6(a) and (b) are another explanatory views for explaining the operation of the cam mechanism;

FIGS. 7(a) and (b) are still another explanatory views for explaining the operation of the cam mechanism;

FIGS. 9(a), (b), and (c) are explanatory views for explaining operation of a conventional cam mechanism illustrated in FIG. 8.

DETAILED DESCRIPTION OF THE INVENTION

An embodiment of the present invention will be described hereinbelow in detail with reference to the accompanying drawings.

Figure 1:
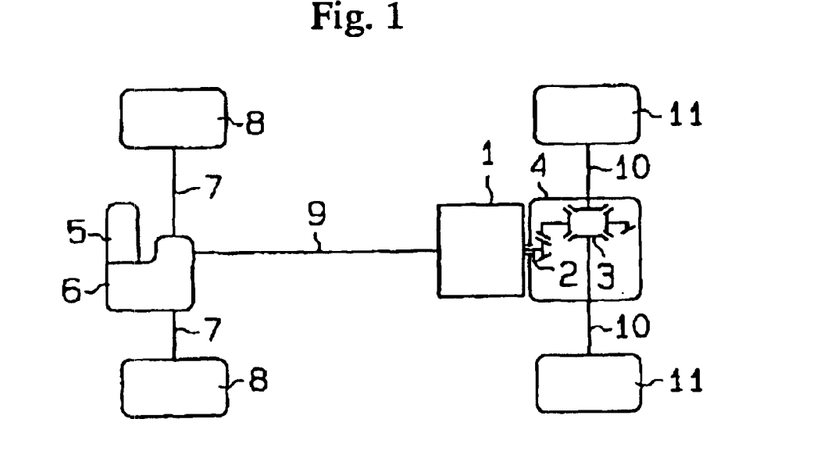
FIG. 1 is a block diagram schematically illustrating a driving force transmitting path for a four-wheel drive vehicle.
Figure 2:
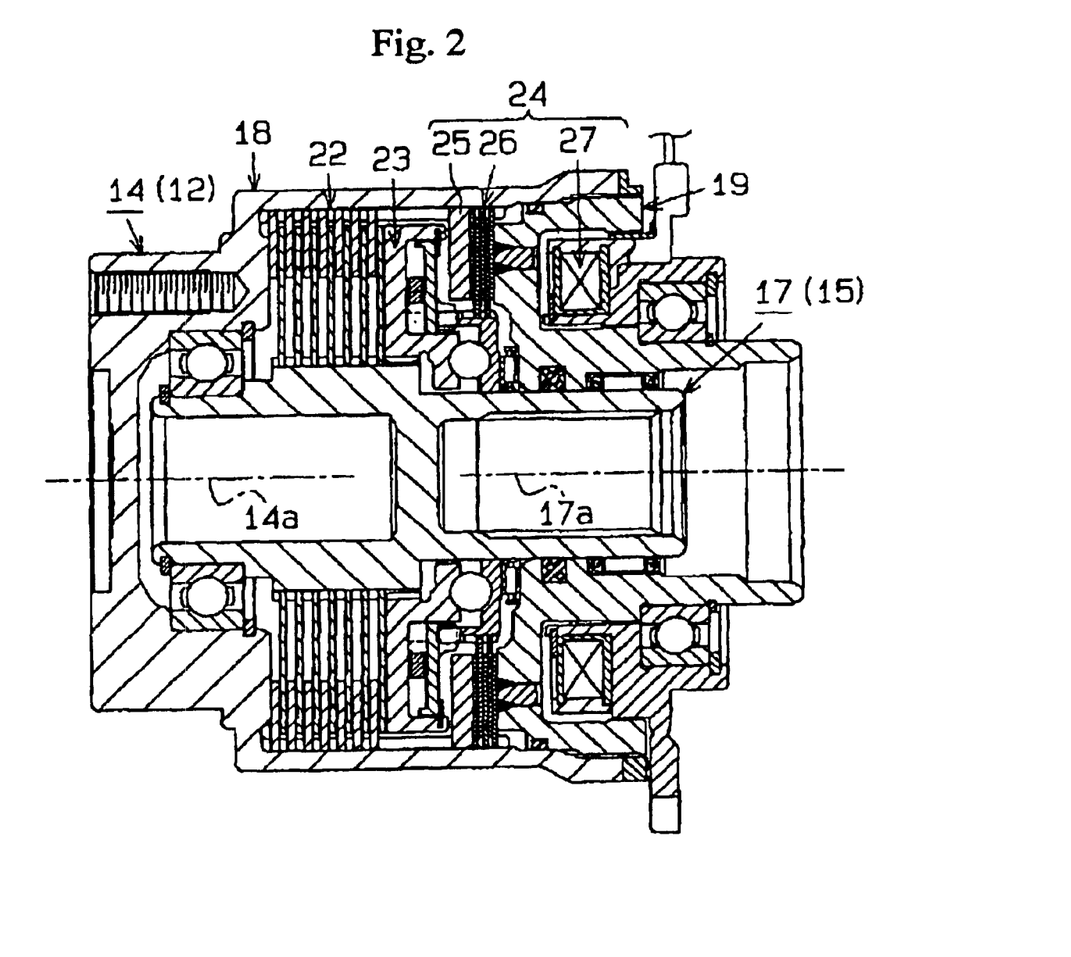
FIG. 2 is a sectional view illustrating a driving force transmitting apparatus illustrated in FIG. 1 according to an embodiment of the present invention.
Figure 3:
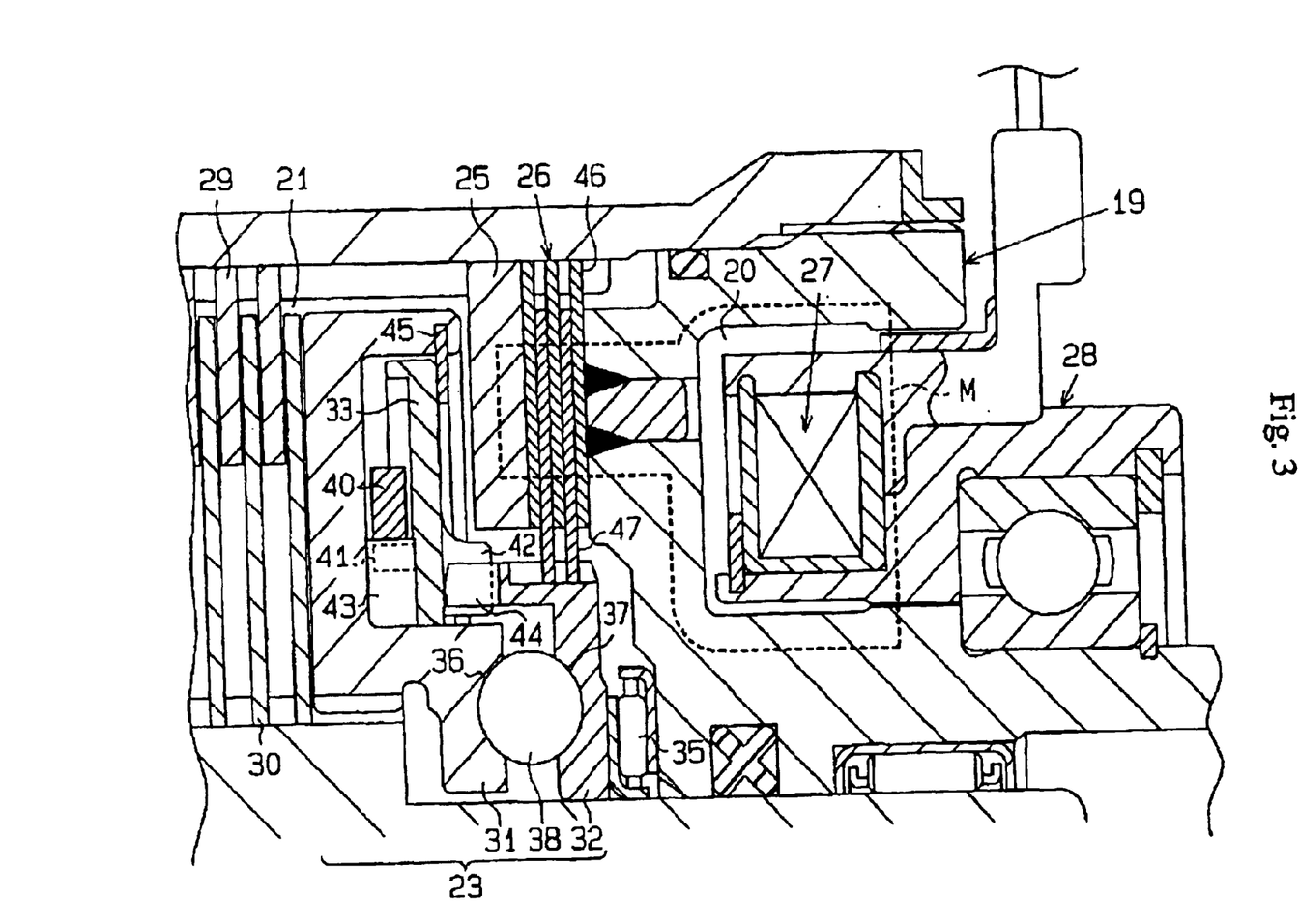
FIG. 3 is a partially expanded sectional view illustrating the driving force transmitting apparatus illustrated in FIG. 2.

In a four-wheel drive vehicle schematically illustrated in FIG. 1, a driving force transmitting apparatus 1 also illustrated in FIGS. 2 and 3 is an electrically controlled torque transmitting apparatus for generating torque in response to electric current supplied to an electromagnet 27. The driving force transmitting apparatus 1 is mounted on the four-wheel-drive vehicle which in an ordinary state behaves as a front-wheel drive vehicle. The driving force transmitting apparatus 1 is operatively coupled to a rear differential gear 3 via a drive pinion shaft 2. The driving force transmitting apparatus 1 is further supported by a differential gear carrier 4, which houses the rear differential gear 3, so as to be fixed to a vehicle body. Driving force from an engine 5 is outputted to a pair of front axles 7 via a transaxle 6, thereby driving front wheels 8. The transaxle 6 is connected to the driving force transmitting apparatus 1 via a propeller shaft 9. When the propeller shaft 9 is connected to the drive pinion shaft 2 via the driving force transmitting apparatus 1 so as to transmit the driving force from the engine 5 to rear wheels 11, the driving force from the engine 5 can be transmitted to the rear wheels 11 via the rear differential gear 3 and a pair of axles 10.

Referring to FIG. 2, a first rotational member 12 includes an outer casing 14 connected to the propeller shaft 9 which operates in association with a driving system for the front wheels 8 (i.e. drive wheels). A second rotational member 15 includes an inner casing 17 connected to the drive pinion shaft 2 which operates in association with a driving system for the rear wheels 11 (i.e. driven wheels). The outer casing 14 includes a front housing 18 and a rear housing 19 which is arranged inside the front housing 18. The outer casing 14 can rotate with a rotational axis 14a relative to the inner casing 17. The rotational axis 14a is arranged to be substantially coaxial with a rotational axis 17a of the inner casing 17. Defined in the rear housing 19 is a rear-side chamber 20 (illustrated in FIG. 3) about an entire circumferential direction of the rear housing 19. Defined in a spacing which is surrounded by the front housing 18, the rear housing 19 and the inner casing 17 is a front-side chamber 21 (illustrated in FIG. 3) about the entire circumferential direction of the inner casing 17. The front-side chamber 21 is closed at both ends by the front and rear housings 18 and 19, respectively. The front-side chamber 21 is filled with lubricant and air and houses a main frictional clutch 22, a cam mechanism 23, an armature 25, and a pilot frictional clutch 26. The rear-side chamber 20 is fitted with the electromagnet 27 and a yoke 28 (illustrated in FIG. 3). The armature 25, the pilot frictional clutch 26, and the electromagnet 27 configure an electromagnetic-type clutch mechanism 24.

As illustrated in FIG. 3, the main frictional clutch 22 is a multiple-disc clutch with plural outer plates 29 and plural inner plates 30. The outer plates 29 are spline-engaged with an inner circumferential surface of the front housing 18 and are aligned along the rotational axis 14a of the outer casing 14. Therefore, the outer plates 29 are rotatable integrally with the outer casing 14 and movable relative to the outer casing 14 along the rotational axis 14a. The inner plates 30 are spline-engaged with an outer circumferential surface of the inner casing 17 and are aligned along the rotational axis 17a of the inner casing 17. The outer plates 29 and the inner plates 30 are disposed alternately in the front-side chamber 21. Therefore, the inner plates 30 are rotatable integrally with the inner casing 17 and movable relative to the inner casing 17 along the rotational axis 17a.

Figure 4:
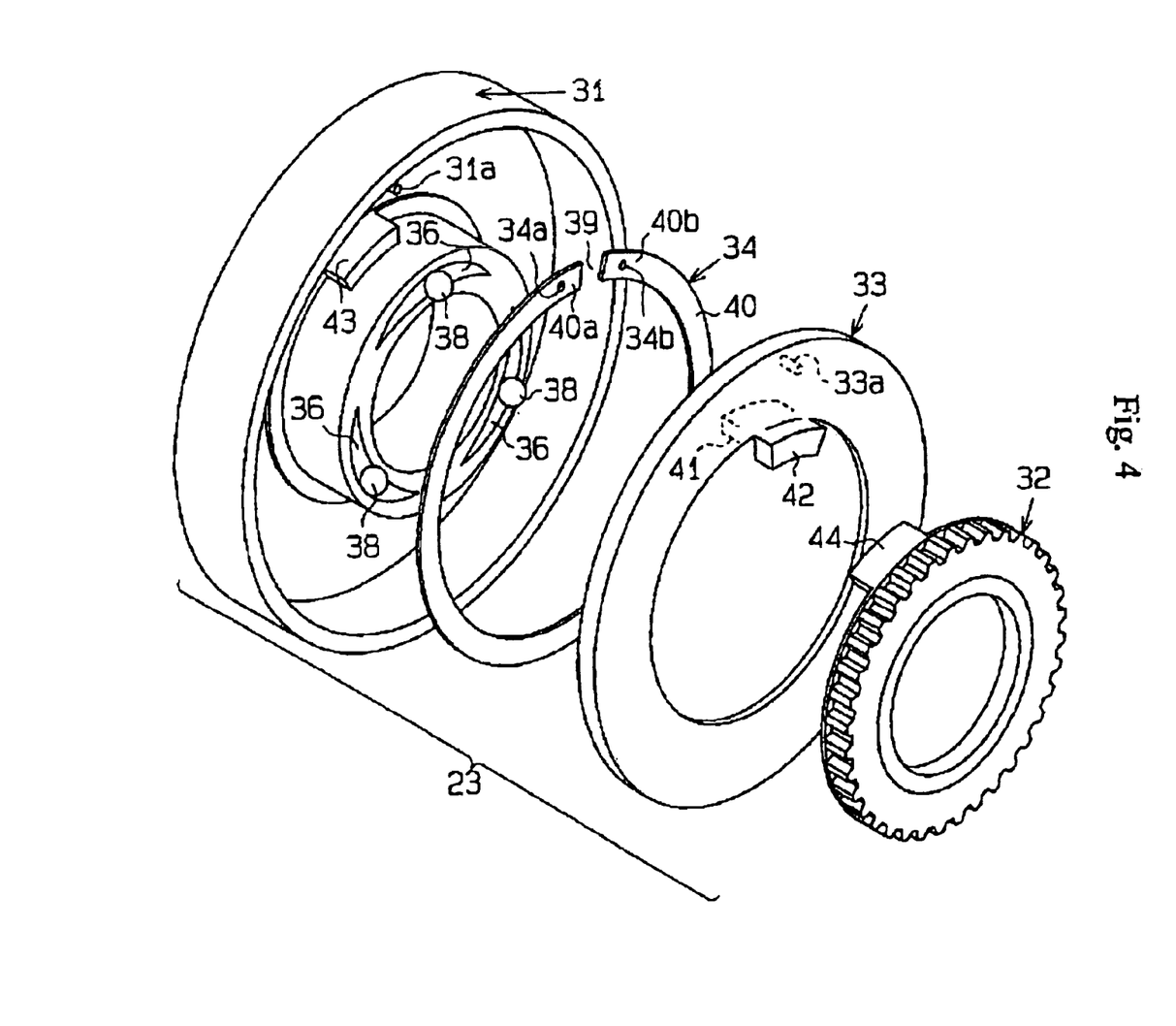
FIG. 4 is a partially exploded perspective view illustrating a cam mechanism illustrated in FIG. 3.

As illustrated in FIG. 4, the cam mechanism 23 includes a main cam member 31, a pilot cam member 32, and a stopper member 33, all of which are relatively rotatable about the rotational axes 14a and 17a. The cam mechanism 23 further includes a biasing member such as a torsion spring 34 (i.e. a biasing means) for biasing the stopper member 33 in a rotational direction thereof. The main cam member 31 is arranged to be adjacent to the main frictional clutch 22 in a substantially parallel manner along the rotational axes 14a and 17a. Further, the pilot cam member 32 is arranged to be adjacent to the rear housing 19 in a substantially parallel manner via the needle roller bearing 35 along the rotational axes 14a and 17a. Still further, the pilot cam member 32 is supported by the needle roller bearing 35 so as to be rotatable relative to the inner casing 17 and the outer casing 14, and so as to be restrained from moving in the extending direction of the rotational axes 14a and 17a. The main cam member 31 is spline-engaged with the outer circumferential surface of the inner casing 17 so as to rotate integrally with the inner casing 17. The main cam member 31 can be pressed against the inner plates 30 of the main frictional clutch 22.

A surface of the main cam member 31 is provided with cam surfaces 36. A surface of the pilot cam member 32, which faces the surface of the main cam member 31, is provided with cam surfaces 37. Plural sets of the cam surface 36 and the cam surface 37 facing the corresponding cam surface 36 are aligned adjacent to the outer periphery of the inner casing 17 with an equal space therebetween along the rotational axes 14a and 17a in the rotational direction of the inner casing 17. A spherical cam member 38 is disposed between the cam surfaces 36 and 37 of each set so as to contact with the cam surfaces 36 and 37. The torsion spring 34 is made of a notch ring 40 possessing a flexibility allowable spacing 39 between an end portion 40a and the other end portion 40b. Compared with a disc spring, the notch ring 40 possesses uniform urging force and simple structure. The notch ling 40 is supported by the main cam member 31. An engaging bore 34a of the end portion 40a is fitted with a shaft portion 31a of the main cam member 31 under the state where the flexibility allowable spacing 39 has been extended, and an engaging bore 34b of the other end portion 40b is fitted with a shaft portion 33a of the stopper member 33 under the aforementioned state. Therefore, the notch ring 40 possesses elasticity in a direction for narrowing the flexibility allowable spacing 39. The stopper member 33 is provided with a restraining means such as engaging projections 41 and 42, and the main cam member 31 and the pilot cam member 32 are provided with engaging projections 43 and 44, respectively. Therefore, the stopper member 33 is biased by the urging force of the notch ring 40 such that the engaging projections 41 and 43 come close to each other. Further, the stopper member 33 is also biased by the urging force of the notch ring 40 such that the engaging projections 42 and 44 come close to each other. The main cam member 31 is equipped with a snap ring 45 for restraining the stopper member 33 from moving in the direction of the rotational axis 17a, thereby enabling to preventing the stopper member 33 from being dropped out of the main cam member 31.

The armature 25 of the electromagnetic type clutch mechanism 24 is disposed around an outer periphery of the pilot cam member 32 between the main cam member 31 and the rear housing 19. The armature 25 is spline-engaged with the inner circumferential surface of the front housing 18 such that the armature 25 is rotatable integrally with the outer casing 14 and movable in the extending direction of the rotational axis 14a of the outer casing 14. The pilot frictional clutch 26 of the electromagnetic type clutch mechanism 24 is provided with three outer plates 46 and two inner plates 47. The pilot frictional clutch 26 is disposed around the outer periphery of the pilot cam member 32 between the armature 25 and the rear housing 19. The three outer plates 46 are spline-engaged with the inner circumferential surface of the front housing 18 such that the outer plates 46 are rotatable integrally with the outer casing 14 and movable in the extending direction of the rotational axis 14a of the outer casing 14. The inner plates 47 and the outer plates 48 are disposed alternately. The inner plates 47 are spline-engaged with the outer circumferential surface of the pilot cam member 32 such that the inner plates 47 are rotatable integrally with the pilot cam member 32 and movable in the extending direction of the rotational axis 17a of the inner casing 17.

When the electromagnet 27 is electrically excited, a magnetic path M is generated around the electromagnet 27 as schematically illustrated by a broken line in FIG. 3. Accordingly, the armature 25 is attracted by the electromagnet 27 via the magnetic path M, whereby the pilot frictional clutch 26 is brought to the fictionally engaged condition. In this case, the pilot cam member 32 can be rotated in the same direction as rotational direction of the outer casing 14. The outer casing 14 integrally rotatable with the propeller shaft 9 rotates relative to the inner casing 17 integrally rotatable with the drive pinion shaft 2. Torque generated in response to the rotation of the outer casing 14 is transmitted to the pilot cam member 32 in accordance with the frictional engagement of the pilot frictional clutch 26. For example, when the vehicle is driven in the forward direction, a torque T is transmitted to the pilot cam member 32 in a direction illustrated in FIG. 5(b). The engaging projection 41 of the stopper member 33 then comes close to the engaging projection 43 of the main cam member 31 by an urging force E of the notch ring 40 and substantially comes in contact with the engaging projection 43 as shown in FIG. 5(a). In the meantime, the engaging projection 44 of the pilot cam member 32 is moved to be away from the engaging projection 42 of the stopper member 33. For example, when the vehicle is driven in the rearward direction or when the engine braking is performed, the torque T is transmitted to the pilot cam member 32 in a direction illustrated in FIG. 6(b). If the above-described torque T is greater than the urging force E of the notch ring 40, the engaging projection 44 of the pilot cam member 32 pushes the engaging projection 42 of the stopper member 33 in the same direction as the torque T, as shown in FIG. 6(a). Therefore, the engaging projection 41 of the stopper member 33 is moved to be away from the engaging projection 43 of the main cam member 31.

In whichever driven condition the vehicle is, each spherical cam member 38 comes in contact with the cam surface 36 of the main cam member 31 and the cam surface 37 of the pilot cam member 32. Consequently, the cam mechanism 23 is brought into an engaged condition P as illustrated in FIGS. 5(a) and 6(a). Therefore, a thrust S is generated to the main cam member 31 substantially in parallel with the rotational axis 14a in response to the relative rotation between the pilot cam member 32 and the main cam member 31. The main frictional clutch 22 is then brought into the frictionally engaged condition in response to the thrust S, wherein the driving force can be transmitted between the outer casing 14 integrally rotatable with the propeller shaft 9 and the inner casing 17 integrally rotatable with the drive pinion shaft 2. Further, the attraction force of the electromagnet 27 varies depending on the electric current supplied to the electromagnet 27. Therefore, the torque T of the cam mechanism 23 can be changed depending on the attraction force, so that the driving force to be transmitted to the rear wheels can be adjusted.

Figure 7:
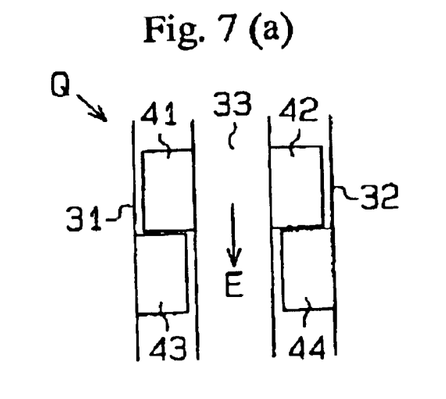

In the meantime, while the electromagnet 27 has not been electrically excited, the magnetic path M is not generated around the electromagnet 27. Therefore, the armature 25 is released from being attracted by the electromagnet 27. The relative rotation is then generated between the outer plates 46 and the inner plates 47. The pilot cam member 32 and the main cam member 31 are integrally rotated with the spherical cam members 38. In the aforementioned condition, a drag torque t in a direction illustrated in FIG. 7(b) may be generated due to high viscosity of oil in the driving force transmitting apparatus at a relatively low temperature. In this case, if the drag torque t is smaller than the urging force E of the notch ring 40, the engaging projection 42 of the stopper member 33 effectively opposes to the engaging projection 44 of the pilot cam member 32. Accordingly, the cam mechanism 23 is brought to a thrust generation restraining condition Q illustrated in FIG. 7(a). In this condition, the main frictional clutch 22 is released from the frictionally engaged condition such that the driving force transmission between the outer casing 14 and the inner casing 17 is interrupted More particularly, during the nonoperation of the clutch mechanism 24 with the electrically nonexcited electromagnet 27, the urging force E applied to the stopper member 33 by the biasing means such as the torsion spring 34 opposes the drag torque t of the pilot cam member 32 before the drag torque t transmitted to the pilot cam member 32 is transformed to the thrust S of the main cam member 31. In other words, the urging force E applied to the stopper member 33 by the biasing means can effectively restrain the thrust S of the main cam member 31 from being generated. Therefore, according to the embodiment of the present invention, the pilot cam member 32 and the main cam member 31 can be effectively prevented from being influenced by the thrust S.

Further, the biasing means such as the torsion spring 34 possesses the urging force E for biasing the stopper member 33 in the rotational direction. Therefore, the pilot cam member 32 and the main cam member 31 can be effectively prevented from being applied with a biasing force substantially in parallel with the rotational axes 14a and 17a.

Still further, even if the driving force transmitting apparatus 1 of the present invention is further provided with a spring similar to a conventionally utilized return spring so as to still enhance control stability of the apparatus 1, the stopper member 33 opposes the drag torque t of the pilot cam member 32. The spring is not hence demanded to possess large urging force. Therefore, rolling resistance (i.e. frictional resistance) of the pilot cam member 32 and the main cam member 31 can be respectively reduced independently of with or without the spring while the drag torque t is restrained.

Figure 5:
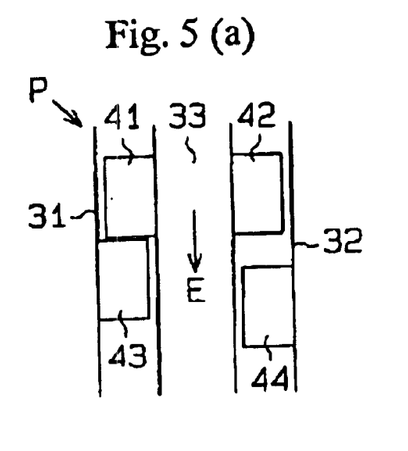
Figure 6:
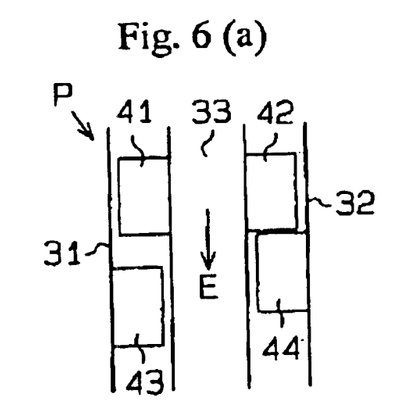

Meanwhile, during the operation of the clutch mechanism 24 with the electrically excited electromagnet 27 as illustrated in FIGS. 5 and 6, the thrust S of the main cam member 31 is generated in response to the torque T transmitted to the pilot cam member 32. The biasing means such as the torsion spring 34 for biasing the stopper member 33 in the rotational direction does not directly influence on the thrust S of the main cam member 31. Therefore, the driving force transmitting apparatus 1 can be stably controlled during the operation of the clutch mechanism 24.

According to the above-described embodiment, the torsion spring 34 is employed as the biasing means. Alternatively, an extension coil spring or a compression coil spring can be employed as the biasing means instead of the torsion spring 34.

Further, the torsion spring 34 is made of a piece of notch ring 40.

Alternatively, the torsion spring 34 can be made of a torsion coil spring possessing the greater number of twisting number.

Still further, the one end 40a of the notch ring 40 can be attached to the pilot cam member 32 and the other end thereof can be attached to the stopper member 33 supported by the pilot cam member 32.

According to the above-described embodiment, the present invention is applied to the driving force transmitting apparatus for the four-wheel drive vehicle. However, the present invention is not limited only to the above preferred embodiment and can be applicable to a torque transmitting mechanism between two shafts such as a clutch.

The principles, preferred embodiment and mode of operation of the present invention have been described in the foregoing specification and drawings. However, the invention which is intended to be protected is not to be construed as limited to the particular embodiment disclosed. Further, the embodiment described herein is to be regarded as illustrative rather than restrictive. The plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A driving force transmitting apparatus comprising:
a main clutch for transmitting driving force between a first rotational member and a second rotational member disposed to be rotatable relative to each other;
a clutch mechanism for bringing a pilot clutch to a frictionally engaged condition; and
a cam mechanism for bringing the main clutch to a frictionally engaged condition when the clutch mechanism operates for bringing the pilot clutch to the frictionally engaged condition, and the cam mechanism including:
a pilot cam member;
a main cam member;
a stopper member, wherein the pilot cam member, the main cam member and the stopper member are relatively rotatable, and a biasing means for biasing the stopper member in a rotational direction for respectively engaging the pilot cam member and the main cam member to the stopper member, wherein a position of the pilot cam member, the main cam member, and the stopper member in a rotational direction is determined depending on a relationship between a biasing force applied to the stopper member by the biasing means and a torque applied to the pilot cam member.

2. A driving force transmitting apparatus comprising:

a main clutch for transmitting driving force between a first rotational member and a second rotational member disposed to be rotatable relative to each other;

a clutch mechanism for bringing a pilot clutch to a frictionally engaged condition; and a cam mechanism for bringing the main clutch to a frictionally engaged condition when the clutch mechanism operates for bringing the pilot clutch to the frictionally engaged condition, and the cam mechanism including:

a pilot cam member;

a main cam member;

a stopper member, wherein the pilot cam member, the main cam member and the stopper member are relatively rotatable, and a biasing means for biasing the stopper member in a rotational direction for respectively engaging the pilot cam member and the main cam member to the stopper member, wherein the main clutch is brought to a frictionally engaged condition by a thrust generated to the main cam member substantially in parallel with a rotational axis of the second rotational member during the operation of the clutch mechanism, the thrust is generated in response to a torque applied to the pilot cam member via the frictionally engaged pilot clutch in accordance with a relative rotation between the first rotational member and the second rotational member during the operation of the clutch mechanism, and the thrust is restrained from being generated to the main cam member by a biasing force of the biasing means applied to the stopper member against a torque which can be applied to the pilot cam member during the nonoperation of the clutch mechanism.

3. A driving force transmitting apparatus according to claim 1, wherein the stopper member includes a restraining means for restraining a relative rotation of the main cam member and the pilot cam member.

4. A driving force transmitting apparatus according to claim 2, wherein the stopper member includes a restraining means for restraining a relative rotation of the main cam member and the pilot cam member.

5. A driving force transmitting apparatus according to claim 3, wherein the restraining means is an engaging projection which engages with the main cam member and the pilot cam member, and the biasing means biases the stopper member in a direction for engaging the engaging projection of the stopper member with the main cam member.

6. A driving force transmitting apparatus according to claim 4, wherein the restraining means is an engaging projection which engages with the main cam member and the pilot cam member, and the biasing means biases the stopper member in a direction for engaging the engaging projection of the stopper member with the main cam member.

7. A driving force transmitting apparatus comprising:

a main clutch for transmitting driving force between a first rotational member and a second rotational member disposed to be rotatable relative to each other;

a clutch mechanism for bringing a pilot clutch to a frictionally engaged condition; and a cam mechanism for bringing the main clutch to a frictionally engaged condition when the clutch mechanism operates for bringing the pilot clutch to the frictionally engaged condition, and the cam mechanism including:

a pilot cam member;

a main cam member;

a stopper member, wherein the pilot cam member, the main cam member and the stopper member are being relatively rotatable, and a biasing means for biasing the stopper member in a rotational direction for respectively engaging the pilot cam member and the main cam member to the stopper member, wherein the main clutch is brought into a frictionally engaged condition by a thrust generated to the main cam member substantially in parallel with a rotational axis of the second rotational member, the thrust is generated response to a torque transmitted to the pilot cam member via the pilot clutch in accordance with a relative rotation between the first rotational member and the second rotational member in a direction, and the thrust is restrained from being generated to the main cam member by a biasing force of the biasing means which restricts a relative rotation between the member and the second rotational member in the other direction.

8. A driving force transmitting apparatus according to claim 1, wherein the biasing means is a torsion spring, one end of the torsion spring is attached to the main cam member, and the other end thereof is a the stopper member.

9. A driving force transmitting apparatus according to claim 2, wherein the biasing means is a torsion spring, one end of the torsion spring is attached to the main cam member, and the other end thereof is attached to the stopper member.

10. A driving force transmitting apparatus according to claim 3, wherein the biasing means is a torsion spring, one end of the torsion spring is attached to the main cam member, and the other end thereof is attached to the stopper member.

11. A driving force transmitting apparatus according to claim 4, wherein the biasing means is a torsion spring, one end of the torsion spring is attached to the main cam member, and the other end thereof is attached to the stopper member.

12. A driving force transmitting apparatus according to claim 5, wherein the biasing means is a torsion spring, one end of the torsion spring is attached to the main cam member, and the other end thereof is attached to the stopper member.

13. A driving force transmitting apparatus according to claim 6, wherein the biasing means is a torsion spring, one end of the torsion spring is attached to the main cam member, and the other end thereof is attached to the stopper member.

14. A driving force transmitting apparatus according to claim 7, wherein the biasing means is a torsion spring, one end of the torsion spring is attached to the main cam member, and the other end thereof is attached to the stopper member.

* * * * *